US009626502B2

(12) United States Patent
Smith et al.

(10) Patent No.: US 9,626,502 B2
(45) Date of Patent: *Apr. 18, 2017

(54) METHOD AND SYSTEM FOR ENTERPRISE NETWORK SINGLE-SIGN-ON BY A MANAGEABILITY ENGINE

(71) Applicant: Intel Corporation, Santa Clara, CA (US)

(72) Inventors: Ned M. Smith, Beaverton, OR (US); Purushottam Goel, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/508,494

(22) Filed: Oct. 7, 2014

(65) Prior Publication Data

US 2015/0095638 A1    Apr. 2, 2015

Related U.S. Application Data

(63) Continuation of application No. 12/319,065, filed on Dec. 30, 2008, now Pat. No. 8,856,512.

(51) Int. Cl.
*G06F 21/41* (2013.01)
*G06F 21/33* (2013.01)
(Continued)

(52) U.S. Cl.
CPC .............. *G06F 21/41* (2013.01); *G06F 21/31* (2013.01); *G06F 21/33* (2013.01); *G06F 21/335* (2013.01); *G06F 21/575* (2013.01); *G06F 21/72* (2013.01); *G06F 21/80* (2013.01); *H04L 9/083* (2013.01); *H04L 9/0822* (2013.01);
(Continued)

(58) Field of Classification Search
CPC ........ G06F 21/41; G06F 21/575; G06F 21/33; G06F 21/335; H04L 63/0807
See application file for complete search history.

(56) References Cited

U.S. PATENT DOCUMENTS 5,919,257 A    7/1999   Trostle
7,231,513 B1*  6/2007   Eydelberg ............... G06F 21/31
                                                      713/166

(Continued)

FOREIGN PATENT DOCUMENTS

KR           100705380 B1    4/2007

OTHER PUBLICATIONS

TCG, "TPM Main—Part 1 Design Principles," Specification Version 1.2, Revision 62, Published Oct. 2, 2003, Retrieved Jun. 1, 2016 at [http://trustedcomputinggroup.org/wp-content/uploads/tpmwg-mainrev62_Part1_Design_Principles.pdf].*

(Continued)

*Primary Examiner* — Robert Leung
(74) *Attorney, Agent, or Firm* — Barnes & Thornburg LLP

(57) ABSTRACT

A manageability engine (ME) receives an authentication response from a user during pre-boot authentication and registers the user with a key distribution center (KDC), indicating that the user has successfully authenticated to the PC. The KDC supplies the ME with single-sign-on credentials in the form of a Key Encryption Key (KEK). The KEK may later be used by the PC to obtain a credential used to establish secure access to Enterprise servers.

16 Claims, 4 Drawing Sheets

(51) Int. Cl.
   *G06F 21/57*   (2013.01)
   *H04L 29/06*   (2006.01)
   *G06F 21/31*   (2013.01)
   *G06F 21/72*   (2013.01)
   *G06F 21/80*   (2013.01)
   *H04L 9/08*    (2006.01)
   *H04L 9/32*    (2006.01)

(52) U.S. Cl.
   CPC ........ *H04L 9/3213* (2013.01); *H04L 63/0807* (2013.01); *H04L 63/0815* (2013.01); *G06F 2221/034* (2013.01); *G06F 2221/2103* (2013.01); *G09G 2358/00* (2013.01)

(56) References Cited

U.S. PATENT DOCUMENTS

| | | | |
|---|---|---|---|
| 7,299,354 B2 | 11/2007 | Khanna et al. | |
| 2004/0268140 A1* | 12/2004 | Zimmer | G06F 21/575 726/3 |
| 2005/0039013 A1* | 2/2005 | Bajikar | G06F 21/32 713/172 |
| 2005/0228993 A1* | 10/2005 | Silvester | G06F 21/32 713/168 |
| 2006/0021018 A1 | 1/2006 | Hinton et al. | |
| 2006/0242280 A1* | 10/2006 | Zimmer | G06F 8/60 709/222 |
| 2007/0282757 A1 | 12/2007 | Pandya et al. | |
| 2008/0083019 A1 | 4/2008 | Wang et al. | |
| 2008/0148046 A1* | 6/2008 | Glancey | G06F 21/33 713/156 |
| 2009/0067688 A1* | 3/2009 | Boshra | G06F 21/32 382/124 |
| 2009/0110200 A1* | 4/2009 | Srinivas | G06F 21/335 380/279 |
| 2009/0327678 A1* | 12/2009 | Dutton | G06F 21/575 713/2 |

OTHER PUBLICATIONS

Menezes, A., et al., "Handbook of Applied Cryptography: Chapter 12, Key Established Protocols," CRC Press, Inc. 1997, 54 pages.
Josang, Audun, et al. "User Centric Identity Management," AusCERT Conference 2005, 13 pages.
Notice of Preliminary Rejection for Korean Patent Application No. 10-2011-035735, dated Mar. 16, 2015, 5 pages.
Office Action received for European Patent Application No. 09252838.9, mailed on Apr. 15, 2010, 7 pages.
Office Action received for Korean Patent Application No. 10-2009-130600, mailed on Feb. 17, 2011, 5 pages of Office Action, including 2 pages of unofficial English translation.
Office Action received for European Patent Application No. 09252838.9, mailed on Apr. 28, 2011, 9 pages.
Office Action received for Korean Patent Application No. 10-2009-130600, mailed on Sep. 23, 2011, 10 pages of Office Action, including 5 pages of unofficial English Translation.
Office Action received for Japanese Patent Application No. 2009-290685, mailed on Mar. 6, 2012, 10 pages of Office Action, including 4 pages of unofficial English translation.
Official Communication received for European Patent Application No. 09252838.9, mailed on May 4, 2012, 9 pages.
Office Action received for Chinese Patent Application No. 200910262640.9, mailed on May 21, 2012, 11 pages of Office Action, including 6 pages of unofficial English translation.
Office Action received for Japanese Patent Application No. 2009-290685, mailed on Jun. 19, 2012, 11 pages of Office Action, including 6 pages of unofficial English translation.
Office Action received for Korean Patent Application No. 10-2009-130600, mailed on Jul. 25, 2012, 5 pages of Office Action, including 2 pages of unofficial English translation.
Office Action received for Japanese Patent Application No. 2009-290685, mailed on Oct. 2, 2012, 6 pages of Office Action, including 2 pages of unofficial English translation.
Official Communication received for European Patent Application No. 09252838.9, mailed on Oct. 18, 2012, 16 pages.
Office Action received for Chinese Patent Application No. 200910262640.9, mailed Nov. 14, 2012, 14 pages of Office Action, including 9 pages of unofficial English translation.
Decision to Grant received for Japanese Patent Application No. 2013-018350 mailed on Feb. 25, 2014, 3 pages of Japanese Decision to Grant.
Notification of Reexamination received for Chinese Patent Application No. 200910262640.9, mailed on Aug. 18, 2014, 12 pages of Notification of Reexamination, including 7 pages of unofficial English translation.
Decision of Reexamination received for Chinese Patent Application No. 200910262640.9, mailed on Dec. 31, 2014, 18 pages of Decision of Reexamination.

\* cited by examiner

METHOD AND SYSTEM FOR ENTERPRISE NETWORK SINGLE-SIGN-ON BY A MANAGEABILITY ENGINE

CROSS-REFERENCE TO RELATED APPLICATION

This application is a continuation application of U.S. application Ser. No. 12/319,065, entitled "Method and System for Enterprise Network Single-Sign-On by a Manageability Engine," which was filed on Dec. 30, 2008, and which issued as U.S. Pat. No. 8,856,512 on Oct. 7, 2014.

BACKGROUND OF THE INVENTION

1. Field of the Invention

The present invention is generally related to user authentication. More particularly, the present invention is related to a method and system for enterprise network single-sign-on using a manageability engine.

2. Description

Intel® Anti-Theft™ Technology for data protection (AT-d) is a platform capability that adds Full Disk Encryption (FDE) to a chipset and its surrounding components. All data on an AT-d-protected drive are encrypted, including OS (Operating System) and user data. Areas that remain unencrypted include manageability engine (ME) metadata and pre-boot authentication metadata areas. Fully encrypting the drive protects sensitive data included in paging and configuring files, and it prevents offline attacker manipulation of system files by a tool kit.

Fully encrypting the drive also presents challenges. For example, the disk drives are off limits to a user until the user is authenticated. Current practices rely on an Operating System (OS) to perform initial authentication, but with FDE, the OS is encrypted, making it difficult to authenticate the user through the OS. Thus, user authentication must occur before any pre-boot service that requires drive access.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Figure 1:
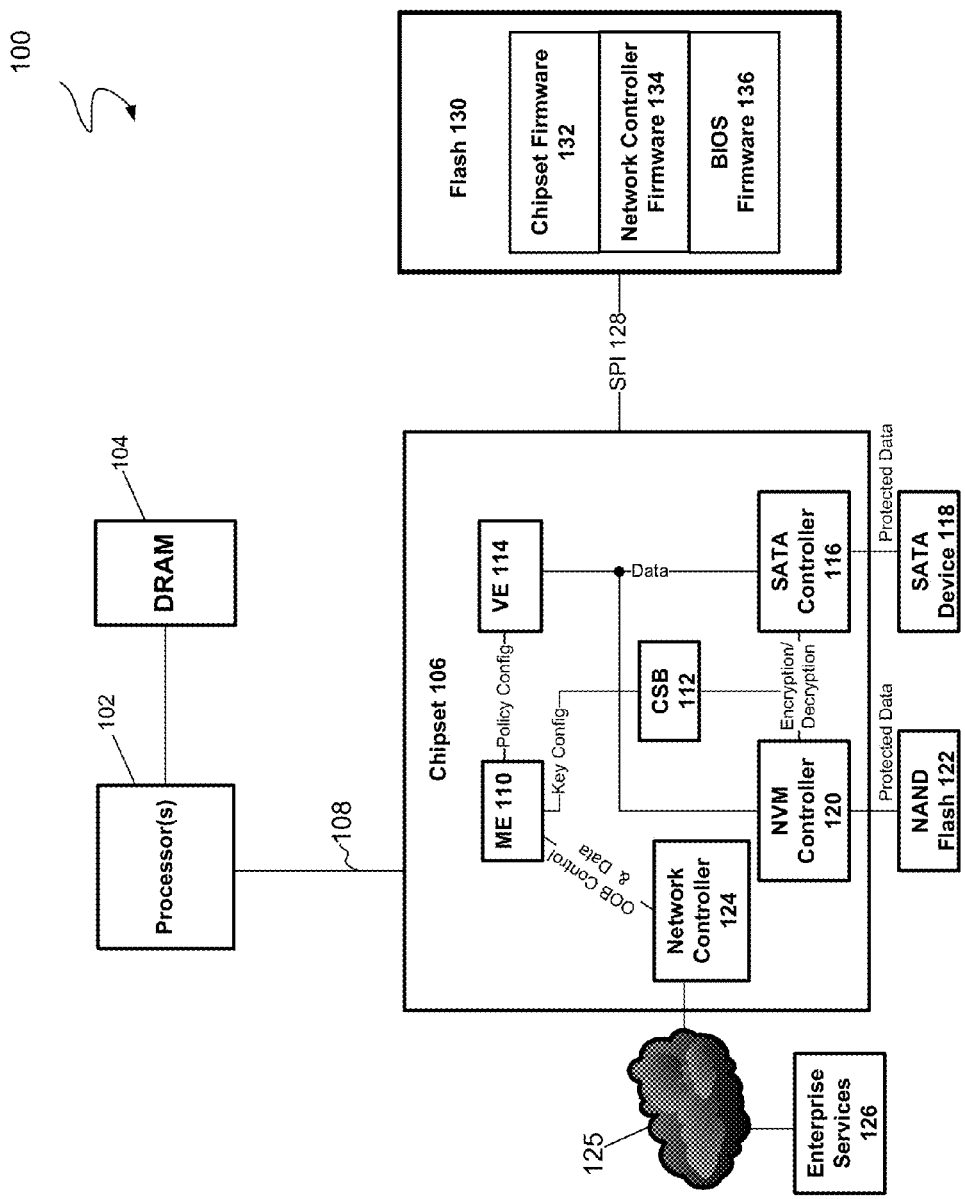
FIG. 1 is a block diagram illustrating an exemplary computer platform in which aspects of described embodiments may be employed.

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention provide for a manageability engine (ME) to receive an authentication response from a user during a pre-boot operation and employ a Kerberos protocol to register with a Kerberos key distribution center (KDC) that the user has successfully authenticated to a PC (personal computer). The KDC supplies the ME with single-sign-on credentials in the form of a Key Encryption Key (KEK) that may later be used by the PC to obtain secure access to enterprise servers.

Embodiments of the present invention provide the ability to perform user authentication using an enterprise identity management service early on in a pre-boot environment. This ability is provided using the manageability engine which enables direct out-of-band access to an Enterprise network to utilize user credentials that are being managed by the Enterprise network. Embodiments of the present invention also enable an Operating System (OS) to recognize that a user has already been authenticated during an OS boot. This is accomplished by allowing a credential manager to intercept an OS user login to determine whether the user has already authenticated with the Enterprise by requesting the KEK from the ME. If the KEK is securely stored in the ME, the KEK is retrieved and returned to the credential manager. The credential manager, upon receiving the KEK, determines that the user has already authenticated to the Enterprise, and suppresses the OS user login prompt, leaving the process to only request a single-sign-on.

Embodiments of the present invention remove the dependency on the Operating System (OS) and its configuration from the platform and allow a virtual machine monitor (VMM), virtual machine (VM), OS, and applications to be used on the platform to be dynamically selected and configured based on user (and machine) identity. User authentication is protected from compromised OS and/or VMM. The authentication to the KDC and subsequent release of user credentials/authorizations to the platform are immune from malware or other attacks on the OS or VMM.

Although embodiments of the present invention are described using Kerberos as the identity management infrastructure, the invention is not limited to a Kerberos infrastructure. One skilled in the relevant art(s) would know that other identity management infrastructures may also be used, such as, for example, SAML (Security Assertion Markup Language), Card Space, Liberty Alliance, Public Key, etc.

FIG. 1 is a block diagram illustrating an exemplary computer platform in which aspects of described embodiments may be employed. A computer platform 100 comprises a processor 102 (also known as an in-band processor). Processor 102 may be coupled to system memory, which in one embodiment may be dynamic random access memory 104. Processor 102 may be any type of processor capable of executing software, such as a microprocessor, digital signal processor, microcontroller, or the like. Although FIG. 1 shows only one such processor 102, there may be one or more processors in platform 100 and one or more of the processors may include multiple threads, multiple cores, or the like.

Processor 102 may be further connected to a chipset 106 via a DMI (Direct Media Interface) interface 108. Chipset 106 comprises, inter alia, a manageability engine (ME) 110, a crypto services block (CSB) 112 and a virtualization engine (VE) 114. CSB 112 is a hardware implementation of an Advanced Encryption Standard (AES) and supports key sizes of 128 and 256 bits. VE 114 is coupled to a Serial Advanced Technology Attachment (SATA) controller 116 that performs SATA command decoding and other accelerated operations for any attached SATA storage devices, such as SATA device 118. VE 114 is also coupled to a non-volatile memory (NVM) controller 120 for caching data on a NVM device, such as, for example, a NAND Flash 122. ME 110 controls the behavior of VE 114 and CSB 112 by configuring policies and keys. ME 110 collects audit events, manages user authentication, and interfaces with Enterprise Services 126. ME 110 uses an out-of-band microcontroller (not shown) and a network controller 124 to interface with Enterprise Services 126 via a network 125. In one embodiment, network 125 may be a wide area network, such as, but not limited to, the Internet.

In an embodiment, chipset 106 is coupled to a non-volatile memory 130 via a serial peripheral interface (SPI) bus 128. The non-volatile memory 130 may be flash memory or static random access memory (SRAM) or the like. In many existing platforms, NVM 130 is flash memory. Flash memory 130 includes chipset firmware 132 for chipset 106 and network controller firmware 134 for network controller 124.

In embodiments, processor 102 has basic input/output system (BIOS) firmware 136 in NVM 130. In other embodiments, processor 102 may boot from a remote device (not shown), wherein the boot vector (pointer) resides in BIOS Firmware 136 of NVM 130. Chipset 106 may have access to all of the contents of NVM 130, including chipset firmware 132 for controlling chipset 106, network controller firmware 134 for controlling network controller 124, and BIOS firmware 136.

Figure 2:
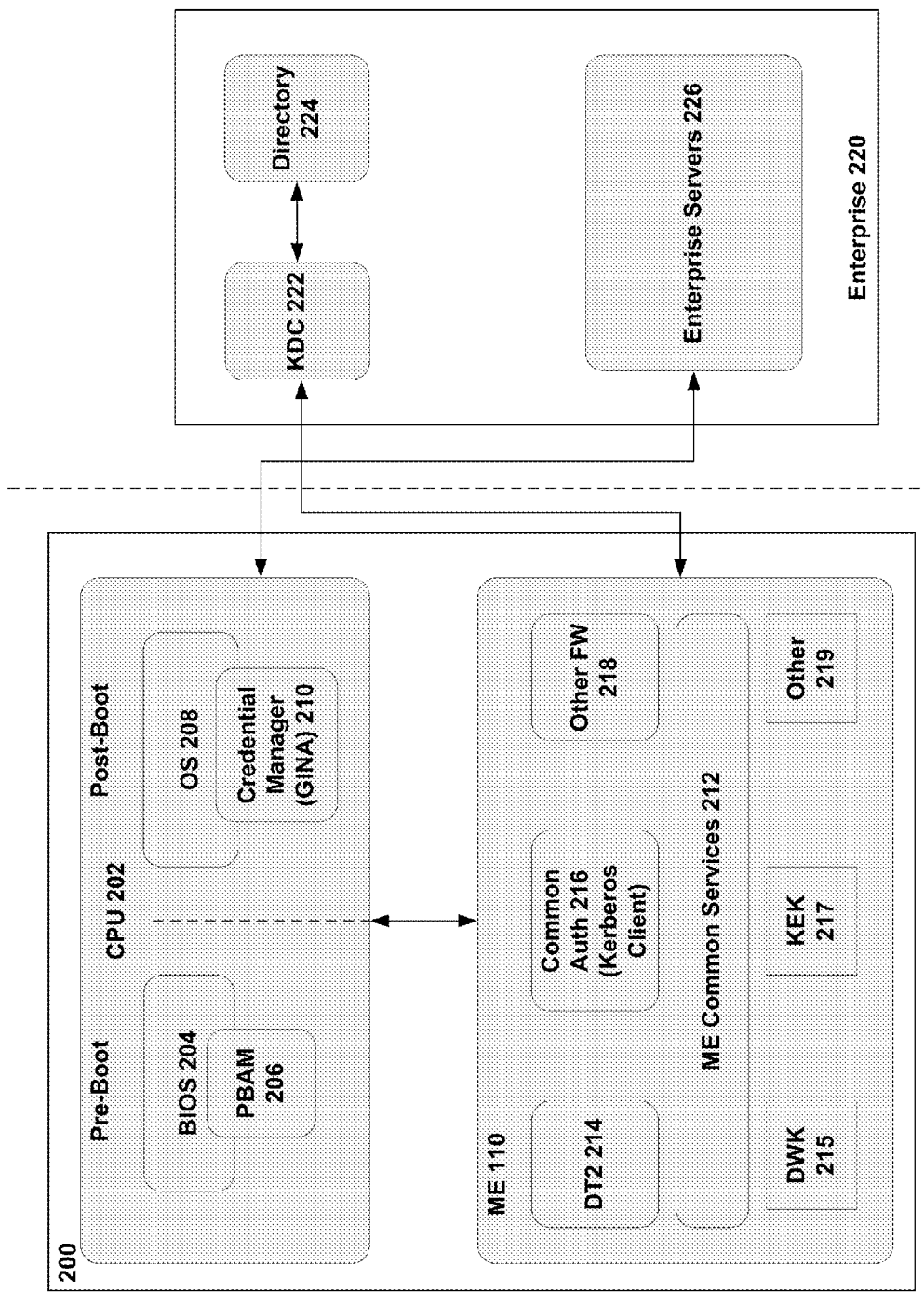
FIG. 2 is a block diagram illustrating a system for enterprise network single-sign-on using a manageability engine according to an embodiment of the present invention.

FIG. 2 is a block diagram illustrating a system for enterprise network single-sign-on using a manageability engine according to an embodiment of the present invention. System 200 comprises a CPU 202 having a pre-boot section and a post-boot section. The pre-boot section includes, inter alia, a Basic Input/Output System (BIOS) 204 and a Pre-Boot Authentication Module (PBAM) 206. The post-boot section includes, inter alia, an Operating System (OS) 208 and GINA (Graphical Identification and Authentication) 210. System 200 also includes manageability engine (ME) 110. ME 110 is coupled to CPU 202.

BIOS 204 refers, in part, to firmware code run by a personal computer (PC) when first powered on. A primary function of BIOS 204 is to identify and initialize system component hardware, such as, for example, a video display card, a hard disk, etc., and other hardware devices. BIOS 204 may be, for example, an EFI (Extensible Firmware Interface) BIOS or a Legacy BIOS. In embodiments of the present invention, a user (not shown) may be authenticated through BIOS 204 using PBAM 206.

PBAM 206 implements the authentication policy for a pre-boot interactive login. PBAM 206 is an extension of BIOS 204 to guarantee a secure, tamper-proof environment external to OS 208 as a trusted authentication layer. PBAM 206 provides an authentication challenge to a user to authenticate the user. For example, PBAM 206 may request a user identification and password from a user. The user identification and password may be compared to stored data to determine whether to authenticate the user. PBAM 206 prevents OS 208 from loading until the user has confirmed that they have the correct password to move forward.

OS 208 is responsible for the management and coordination of activities and the sharing of resources for the computer platform. OS 208 may be, for example, a Microsoft Windows OS or a Linux OS.

GINA (Graphical Identification and Authentication) 210 is a dynamic link library (DLL) that implements an authentication policy for an OS interactive login model. Also known as a credential manager, GINA performs all identification and authentication user interactions for user authentication at the OS.

ME 110 comprises, inter alia, an ME Common Services module 212. ME Common Services (CS) module 212 represents a firmware layer running on manageability engine 110. CS 212 provides a communications stack that allows ME 110 to connect to an enterprise network, such as for example, Enterprise 220. CS 212 also provides a pluggin interface where firmware modules can be added/removed to increase/decrease the functionality of chipset 106, respectively. In an embodiment of the present invention, DT2 Module 214 and Common Authentication Module (CAM) 216 are firmware pluggins providing additional functionality to chipset 106. Other FW 218 illustrates an exemplary place holder for another firmware module. Encryption keys DWK (device wrap key) 215 and KEK (key encryption key) 217 are the corresponding credentials for DT2 module 214 and CAM 216, respectively, and are shown securely stored on the platform. Other 219 is the placeholder for an encryption key for Other FW 218.

DT2 Module 214 is a firmware pluggin that controls access to encrypted storage devices. DWK 215 is an encryption key/credential that is used to unlock encrypted disks using firmware pluggin DT2 214. Access to encryption key DWK 215 is conditional based upon successful authentication of the user or an administrator.

Common Authentication Module (CAM) 216 is a firmware pluggin that is primarily responsible for interfacing with pre-boot BIOS code, option ROM or other host firmware modules that perform user authentication challenges. The responses to the challenges are supplied to CAM 216 where asserted identities are verified. In one embodiment, CAM 216 is also known as a Kerberos client. KEK 217, also referred to as a Kerberos ticket granting ticket or TGT, is the encryption key/credential that is used to obtain tickets for accessing Enterprise services 126 via Enterprise servers 226. Access to encryption key KEK 217 is conditional based upon successful authentication of the user or an administrator.

System 200 interfaces to an Enterprise 220 via a network (as shown in FIG. 1). Enterprise 220 includes a Key Distribution Center (KDC) 222, a Directory (224), and Enterprise Services 126 via Enterprise Servers 226.

KDC 222 is an authentication server used to help authenticate users and services. KDC 222 distributes tickets to enable access to services, such as Enterprise services. KDC 222, in response to an initial authentication request from a client issues a special key known as a Key Encryption Key (KEK), which is also defined as Ticket Granting Ticket (TGT) in a Kerberos challenge response protocol. If the users are actually who they profess to be, they can use the KEK/TGT to obtain other service tickets to Enterprise services 126 without having to re-enter their password. KDC 222, through a backend interface (not shown), interfaces with directory 224 to obtain information regarding a user, host, or service.

Directory 224 stores data associated with users, host, and services. The data stored in directory 224 may include, but is not limited to, user name, password and password expiration date, and attributes of any tickets regarding a service held by the user.

Figure 3:
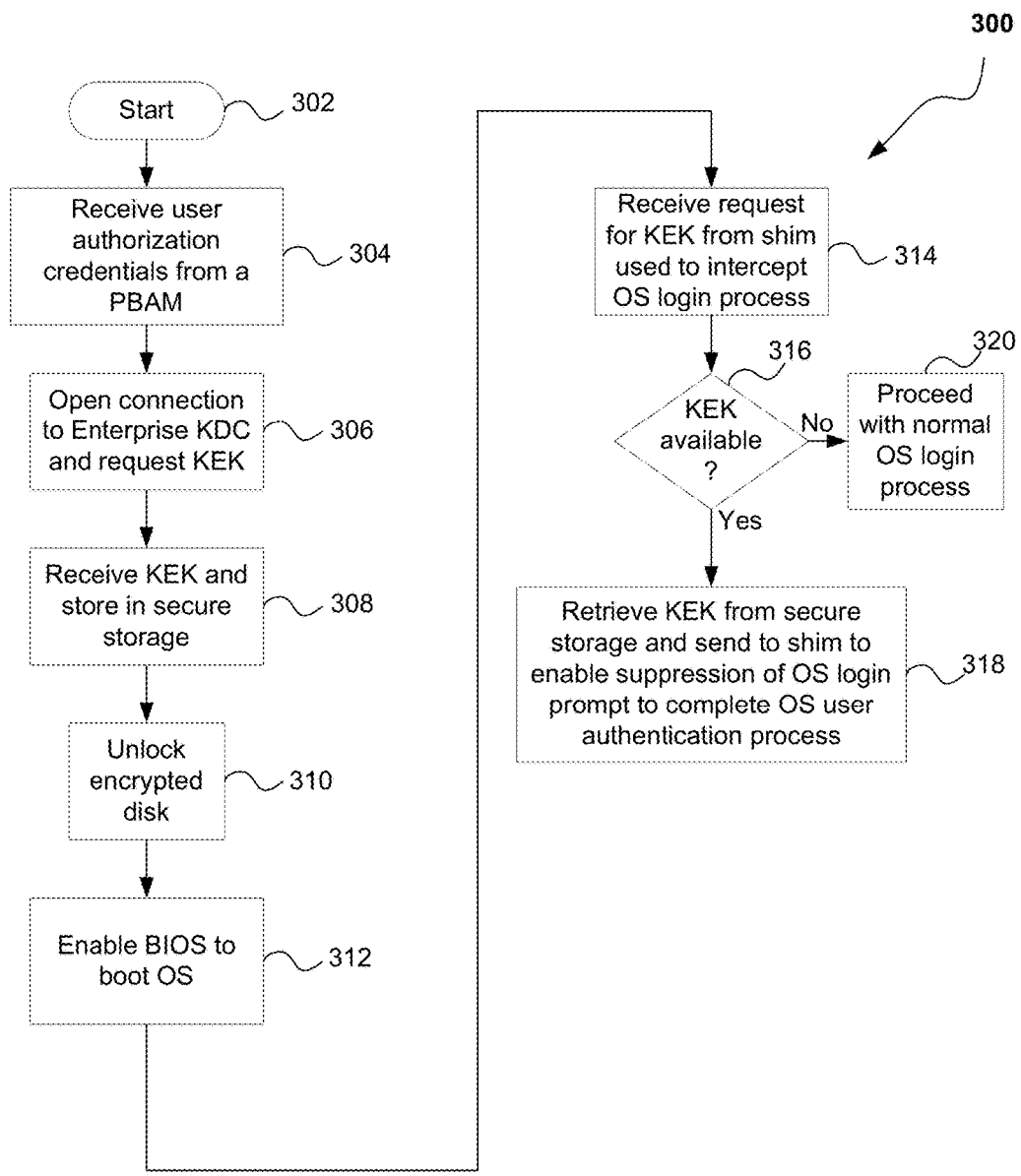
FIG. 3 is a flow diagram describing an exemplary method for enterprise network single-sign-on using a manageability engine according to an embodiment of the present invention.

FIG. 3 is a flow diagram 300 describing an exemplary method for enterprise network single-sign-on using a manageability engine according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, the ME common authentication module receives user authentication credentials (i.e., user identification and password) from the PBAM. A user authenticates to the PBAM through the BIOS. The PBAM provides an authentication challenge to a user to authenticate the user. For example, the PBAM may request a user identification and password from the user. In response to the challenge, the user provides the PBAM with the user authentication credentials and sends the user authentication credentials to the ME. The process proceeds to block 306.

In block 306, the ME opens a connection to an Enterprise KDC to request a key encryption key (KEK), also known as a ticket granting ticket (TGT). The KEK may be used to obtain service tickets for accessing Enterprise servers 226 for services 126. The Enterprise KDC performs an Enterprise challenge response protocol to verify/authenticate the user as a known entity of the Enterprise by querying a directory service containing information about the user. The directory service may be a Microsoft Active Directory, LDAP (Lightweight Directory Access Protocol), or some other directory service. If the user is a known entity (i.e., the user identification and password are authentic), the Enterprise KDC will return a KEK. The Enterprise KDC will also return any other authorization information related to user privileges, group memberships or any other constraints for the user. The KEK has the authority to request a server specific ticket to an Enterprise server. The process then proceeds to block 308.

In block 308, the ME common authentication module receives the KEK and any other authorization information related to the user and stores the KEK securely in platform flash or some other secured storage area. Once the KEK is securely stored in the flash, it is under the control of the ME, thus, the ME now has the authority grant to obtain a service specific ticket to an Enterprise server. The process then proceeds to block 310.

In one embodiment, the ME can perform an action based on the successful authentication of the user, it can obtain a service specific ticket, or it can perform a service under ME common services.

In block 310, platform resources, such as, for example, encrypted disks, may be unlocked using a token supplied by the directory or by deriving a device wrap key (DWK) from an authentication parameter. The process then proceeds to block 312.

At this point in the process, the user has essentially logged on to the ME using the enterprise user credentials (single-sign-on credentials). The BIOS now needs to load the OS, and the user needs to be authenticated to the OS. In block 312, the ME directs the process back to the BIOS (i.e., BIOS 206) to boot the OS. The process then proceeds to block 314.

When the OS is booted, it goes through its normal process until it gets to the point where it is ready to authenticate the user to the OS. This is performed by invoking a credential manager, such as, for example, Microsoft GINA. During the GINA process, it must be decided whether to prompt the user for the user authentication credentials or to obtain the credentials automatically from the ME. In block 314, a software shim, such as, for example, a GINA wrapper, is used to intercept the normal OS login process at the point where a user login screen is to be presented to the user. The software shim queries the ME to verify that the user has already authenticated with Enterprise 220 by requesting the KEK. The process then proceeds to decision block 316.

In decision block 316, it is determined whether the KEK is available. If the KEK is available, the process proceeds to block 318.

In block 318, the KEK request is vectored to the ME, where the KEK is retrieved from the secure storage and returned to the shim, where the shim determines that the user has already authenticated to the Enterprise, and suppresses the user login prompt, leaving the process to only request a single-sign-on.

Returning to decision block, 316, if it is determined that the KEK is not available, the user login prompt will not be suppressed, and the OS user authentication process will proceed as normal (block 320).

The OS, when needing access to resources or services on the Enterprise servers, can now use the local KEK to obtain a ticket specific to the appropriate Enterprise server. The ticket may be used to construct a secure communication channel between the OS and the Enterprise server. In one embodiment, a TLS protocol may be used to negotiate a TLS session.

Figure 4:
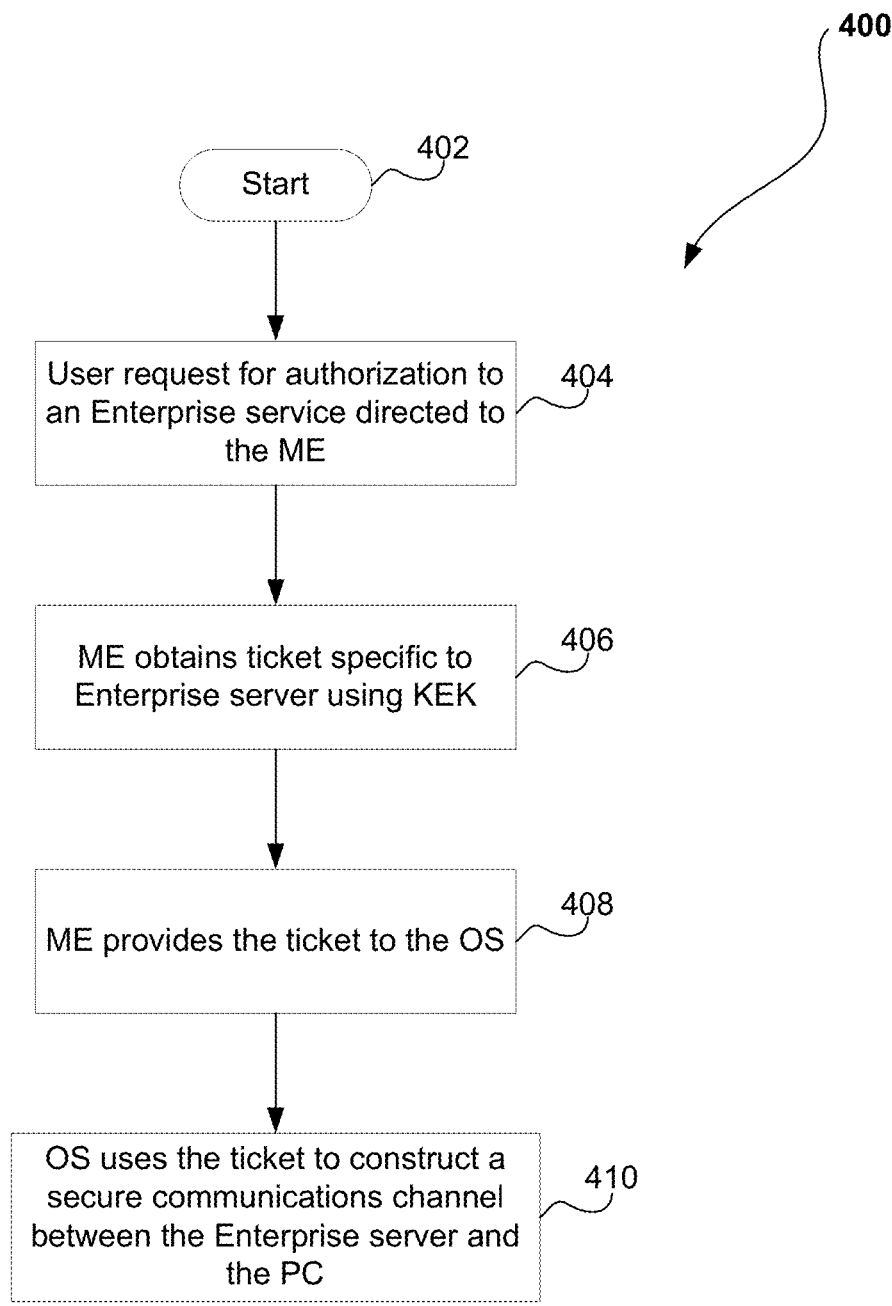
FIG. 4 is a flow diagram describing an exemplary method for enabling access to resources or services from one or more Enterprise servers according to an embodiment of the present invention.

FIG. 4 is a flow diagram 400 describing an exemplary method for enabling access to resources or services from one or more Enterprise servers according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins with block 402, where the process immediately proceeds to block 404.

In block 404, when a user requests authorization to an Enterprise service or resource, the request is directed to the ME. The process then proceeds to block 406.

In block 406, the ME uses the KEK to obtain a ticket specific for the Enterprise server providing the service from the Enterprise KDC. The process then proceeds to block 408.

In block 408, the ME, upon receiving the ticket for the service, provides the ticket to the OS (or application in the OS space). In one embodiment, the ticket may include a key embedded in the ticket. The process then proceeds to block 410.

In block 410, the OS may use the ticket to construct a secure communications channel between the Enterprise server and PC. In one embodiment, a TLS protocol may be used to negotiate a TLS session between the PC and the server.

Certain aspects of embodiments of the present invention may be implemented using hardware, software, or a combination thereof and may be implemented in one or more computer platforms or other processing systems. In fact, in one embodiment, the methods may be implemented in programs executing on programmable machines such as mobile or stationary computers, personal digital assistants (PDAs), set top boxes, cellular telephones and pagers, and other electronic devices that each include at least one processor, a storage medium readable by the at least one processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer platform configurations, including multiprocessor systems, minicomputers, mainframe computers, and the like.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, etc. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

The invention claimed is:

1. A computing device for logging on to a manageability engine, the computing device comprising:
   a memory;
   a main processor coupled to the memory to execute platform firmware, the platform firmware including a pre-boot authentication module to authenticate a user, wherein the pre-boot authentication module is separate from an operating system of the computing device; and
   a manageability engine including an out-of-band processor separate from the main processor, wherein the manageability engine is to:
      receive, by the out-of-band processor, user authentication credentials from the pre-boot authentication module;
      open, by the manageability engine, an out-of-band network connection to a key distribution center of an enterprise network;
      request, by the out-of-band processor independent of the main processor, a key encryption key from the key distribution center via the out-of-band network connection in response to receipt of the user authentication credentials;
      receive, by the out-of-band processor independent of the main processor, the key encryption key from the key distribution center via the out-of-band network connection; and
      securely store, by the out-of-band processor, the key encryption key.

2. The computing device of claim 1, wherein the manageability engine is further to:
   obtain, by the out-of-band processor in response to an operating system request for access to an enterprise service, a ticket specific to the enterprise service using the key encryption key, wherein the operating system of the computing device retrieves the ticket specific to the enterprise service from the manageability engine.

3. The computing device of claim 1, further comprising:
   a shim to (i) wrap an operating system credential manager, wherein the operating system credential manager is configured to authenticate the user to the operating system of the computing device and (ii) intercept an operating system login process;
   wherein the manageability engine is further to:
      receive a request for the key encryption key from the shim in response to interception of the operating system login process;
      retrieve, by the out-of-band processor, the key encryption key from secure storage; and
      send, by the out-of-band processor, the key encryption key to the shim; and
   wherein the shim is further to suppress an operating system login prompt in response to receipt of the key encryption key.

4. A method for logging on to a manageability engine, the method comprising:
   executing, by a main processor of a computing device, platform firmware including a pre-boot authentication module to authenticate a user, wherein the pre-boot authentication module is separate from an operating system of the computing device;
   receiving, by an out-of-band processor of the computing device, user authentication credentials from the pre-boot authentication module, wherein the out-of-band processor is separate from the main processor of the computing device;
   opening, by a manageability engine of the computing device, an out-of-band network connection to a key distribution center of an enterprise network, wherein the manageability engine includes the out-of-band processor;

requesting, by the out-of-band processor independent of the main processor, a key encryption key from the key distribution center via the out-of-band network connection in response to receiving the user authentication credentials;

receiving, by the out-of-band processor independent of the main processor, the key encryption key from the key distribution center via the out-of-band network connection; and securely storing, by the out-of-band processor, the key encryption key.

5. The method of claim 4, further comprising:

obtaining, by the out-of-band processor in response to an operating system request for access to an enterprise service, a ticket specific to the enterprise service using the key encryption key, wherein the operating system of the computing device retrieves the ticket specific to the enterprise service from the out-of-band processor.

6. The method of claim 4, further comprising:

unlocking, by the out-of-band processor, a platform resource in response to securely storing the key encryption key.

7. The method of claim 6, wherein the platform resource comprises an encrypted disk.

8. The method of claim 6, wherein unlocking the platform resource comprises unlocking the platform resource using a token received from the key distribution center.

9. The method of claim 6, wherein unlocking the platform resource comprises deriving a device wrap key based on an authentication parameter.

10. The method of claim 4, further comprising:

wrapping, by the computing device, an operating system credential manager with a shim, wherein the operating system credential manager is configured to authenticate the user to the operating system of the computing device;

intercepting, by the shim wrapping the operating system credential manager, an operating system login process;

receiving, by the out-of-band processor, a request for the key encryption key from the shim in response to intercepting the operating system login process;

retrieving, by the out-of-band processor, the key encryption key from secure storage;

sending, by the out-of-band processor, the key encryption key to the shim; and suppressing, by the shim, an operating system login prompt in response to receiving the key encryption key.

11. A computing device for logging on to a manageability engine, the computing device comprising:

a memory;

a main processor coupled to the memory to execute platform firmware, the platform firmware including a pre-boot authentication module to authenticate a user, wherein the pre-boot authentication module is separate from an operating system of the computing device; and a manageability engine including an out-of-band processor separate from the main processor, wherein the manageability engine is to:

receive, by the out-of-band processor, user authentication credentials from the pre-boot authentication module;

open, by the manageability engine, an out-of-band network connection to a key distribution center of an enterprise network;

request, by the out-of-band processor independent of the main processor, a key encryption key from the key distribution center via the out-of-band network connection in response to receipt of the user authentication credentials;

receive, by the out-of-band processor independent of the main processor, the key encryption key from the key distribution center via the out-of-band network connection;

securely store, by the out-of-band processor, the key encryption key; and unlock, by the out-of-band processor, a platform resource in response to secure storage of the key encryption key.

12. The computing device of claim 11, wherein the platform resource comprises an encrypted disk.

13. The computing device of claim 11, wherein to unlock the platform resource comprises to unlock the platform resource with a token received from the key distribution center.

14. The computing device of claim 11, wherein to unlock the platform resource comprises to derive a device wrap key based on an authentication parameter.

15. The computing device of claim 11, wherein the manageability engine is further to:

obtain, by the out-of-band processor in response to an operating system request for access to an enterprise service, a ticket specific to the enterprise service using the key encryption key, wherein the operating system of the computing device retrieves the ticket specific to the enterprise service from the manageability engine.

16. The computing device of claim 11, further comprising:

a shim to (i) wrap an operating system credential manager, wherein the operating system credential manager is configured to authenticate the user to the operating system of the computing device and (ii) intercept an operating system login process;

wherein the manageability engine is further to:

receive a request for the key encryption key from the shim in response to interception of the operating system login process;

retrieve, by the out-of-band processor, the key encryption key from secure storage; and send, by the out-of-band processor, the key encryption key to the shim; and wherein the shim is further to suppress an operating system login prompt in response to receipt of the key encryption key.

* * * * *